United States Patent [19]

Weemaes et al.

[11] 4,126,895

[45] Nov. 21, 1978

[54] DATA PROCESSING SYSTEM WITH MONITORING AND REGULATION OF PROCESSOR FREE TIME

[75] Inventors: Freddy W. G. Weemaes, De Klinge; Valère J. M. Carruet, Mechelen, both of Belgium

[73] Assignee: International Standard Electric Corporation, New York, N.Y.

[21] Appl. No.: 644,743

[22] Filed: Dec. 29, 1975

[51] Int. Cl.² .................... G06F 3/00; G06F 11/00
[52] U.S. Cl. .................................................. 364/200
[58] Field of Search ............... 340/172.5; 444/1; 364/200 MS File, 900 MS File, 300; 179/18 ES, 8 A

[56] References Cited

U.S. PATENT DOCUMENTS

| | | | |
|---|---|---|---|
| 3,352,974 | 11/1967 | Minchenko | 179/8 A |
| 3,370,276 | 2/1968 | Schell, Jr. | 340/172.5 |
| 3,421,150 | 1/1969 | Quosig et al. | 364/200 |
| 3,426,331 | 2/1969 | Joyce | 340/172.5 |
| 3,540,003 | 11/1970 | Murphy | 364/200 |
| 3,568,165 | 3/1971 | Kerr | 340/172.5 |
| 3,588,837 | 6/1971 | Rash et al. | 364/200 |
| 3,593,300 | 7/1971 | Driscoll, Jr. et al. | 340/172.5 |
| 3,623,007 | 11/1971 | Eckhart et al. | 340/172.5 |
| 3,643,227 | 2/1972 | Smith et al. | 364/200 |
| 3,771,144 | 11/1973 | Belady et al. | 340/172.5 |
| 3,829,618 | 8/1974 | Brandon | 179/8 A |
| 4,040,021 | 8/1977 | Birchall et al. | 364/200 |
| 4,050,095 | 9/1977 | Pettipher et al. | 364/200 |

OTHER PUBLICATIONS

E. S. Hoover et al., "Performance of a Monitor for a Real-Time Control System," in *Proceedings-Fall Joint Computer Conference*, 1966, pp. 23-35.

*Primary Examiner*—Melvin B. Chapnick
*Attorney, Agent, or Firm*—James B. Raden; Marvin M. Chaban

[57] ABSTRACT

A data processing system using a central processor, in which the free time of the processor is monitored at predetermined intervals. A count is maintained as to the state of the processor at each monitoring, i.e., free or occupied. The chosen interval for monitoring is at least equal to the normal cycle time of the processor between program cycle interrupts. The amount of free time of the computer is determined by this monitoring. The work load or occupancy level of the process is regulated periodically when the free time count is found to be outside of the upper and lower limits which may be revised periodically. This regulation takes the form of limiting or increasing the work input to the system.

7 Claims, 2 Drawing Figures

DATA PROCESSING SYSTEM WITH MONITORING AND REGULATION OF PROCESSOR FREE TIME

BACKGROUND OF THE INVENTION

1. Field of the Invention

The present invention relates to a data processing system including a computer having means for ascertaining the occupancy level of the computer and having work load regulating means controlled by the ascertaining means for regulating the computer work load as a function of the ascertained occupancy level.

2. Description of the Prior Art

Such a data processing system is known from U.S. Pat. No. 3,623,007. In this known system the ascertaining means find the occupancy level of the computer by measuring the time interval which elapses between repetitive performances of a particular program and more particularly of the program with the lowest repetition frequency. A drawback of this known system is that when this lowest repetition frequency has a relatively small value a relatively long time interval elaspes between two consecutive measurements of the computer occupancy level and consequently the work load can only be regulated at relatively infrequent moments although prompt action may be required, e.g., in case of an abnormal load.

Another drawback of this known system is that when e.g., the number of programs is modified one may have to adjust the criteria for determining the occupancy level of the computer, since the time interval elapsing between repetitive performances of the above mentioned particular program may then have changed.

SUMMARY OF THE INVENTION

An object of the present invention is therefore to provide a data processing system of the above type which does not present the last mentioned drawbacks.

According to the present invention the foregoing and ancillary objects are attained by providing that the computer under normal work load conditions and considered over a predetermined time interval (10 ms) has free time available and that the ascertaining means (FIG. 1) periodically measure said free time after time periods (100 ms) at least equal to the time interval (10 ms) and determine the occupancy level from the measured free time.

Hence, the ascertaining means determine the occupancy level of the computer with a periodicity which is independent of the repetition frequency of programs and which may be made so short that prompt action is possible if required.

In accordance with a preferred embodiment of the invention the present data processing system includes computer ascertaining means adapted to periodically measure the free time of the computer and to compare this free time with a first and a second time value, and work load regulating means which are adapted to limit the work load as a function of the measured free time. Hereby use is made of a work load register each of the positions of which defines a predetermined work load and which may be stepped between a first position defining a maximum work load and a second position defining a minimum work load depending on the result of the above comparison. Each time the measured free time is found to be at least equal to the first time value the work load register is stepped by one step towards the first position until this first position is reached. Each time the measured free time is found to be at most equal to the second time value the work load register is stepped by one step towards the second position until the second position is reached. Finally, when the measured free time is found to lie between the first and second time values the work load register is not stepped.

Another characteristic of the present data processing system is that the ascertaining means (FIG. 1) are able to compare the measured free time with a first and a second predetermined time value at the end of each of the time periods (100 ms), that the work load regulating means (FIG. 2) are adapted to vary the value of said work load between a maximum limit value and a minimum limit value and vice-versa in a stepwise manner, each step being performed at the end of a the time period, and that said work load regulating means at the end of each of the time periods increase said work load if the measured free time is found to be at least equal to said first predetermined time value, decrease the work load if the measured free time is found to be at most equal to the second predetermined time value, and do not vary the work load if said measured free time is found to lie between the second and first predetermined time values.

Still another characteristic of the present data processing system is that the work load regulating means (FIG. 2) at the end of each of the time periods (100 ms) maintain the work load constant if said measured free time is found to lie between the second and first predetermined time values.

In this way the danger of occurrence of an rapidly fluctuating computer load is considerably reduced.

DESCRIPTION OF THE DRAWINGS

The above-mentioned and other objects and features of the invention will become more apparent and the invention itself will be best understood by referring to the following description of an embodiment taken in conjunction with the accompanying drawings wherein:

FIG. 1, shows the portion of the processor used for regulating its work load.

DESCRIPTION OF A PREFERRED EMBODIMENT

Figure 1:
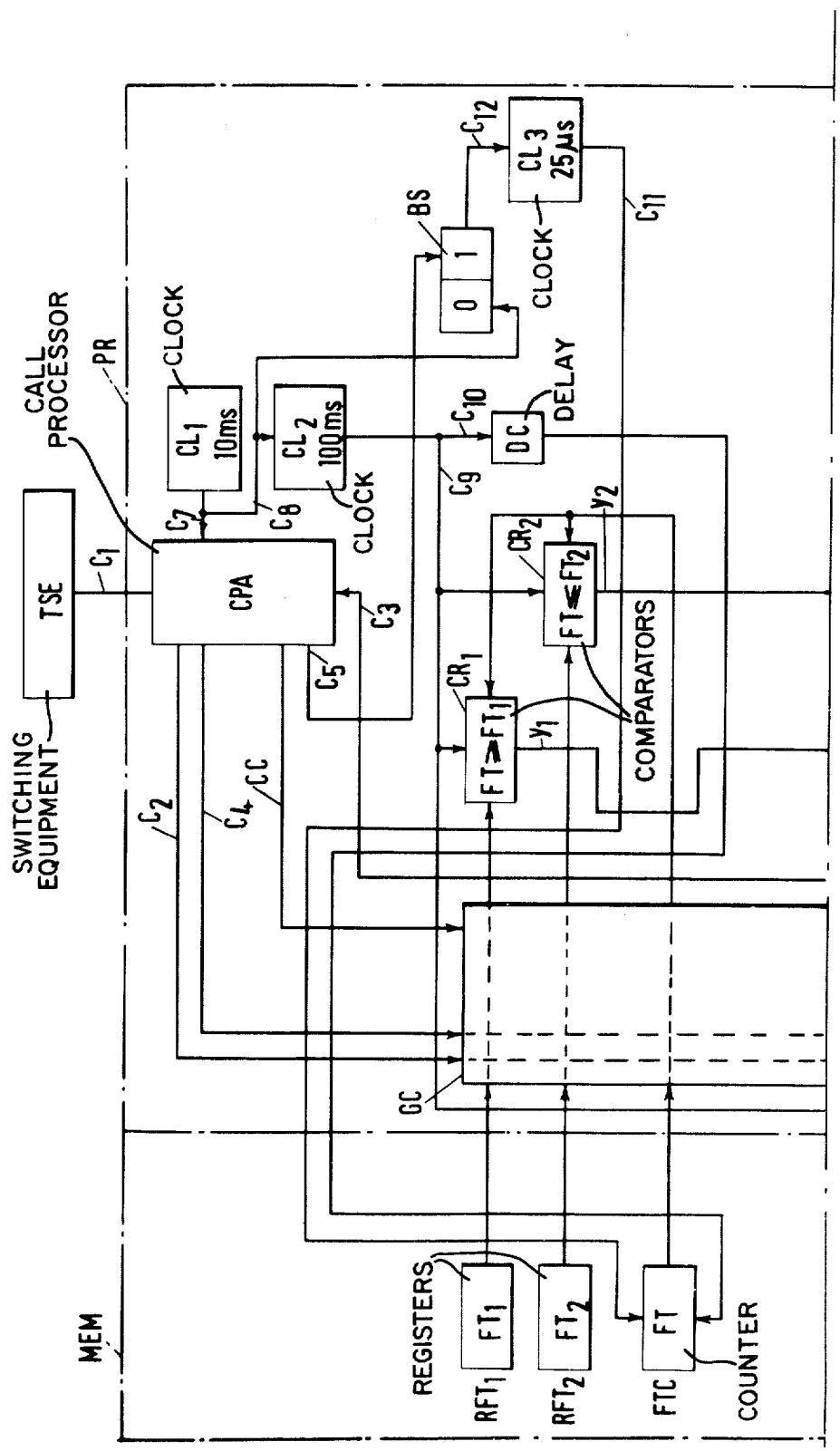
FIG. 1 schematically shows a portion of a data processing system designed for use in telecommunication switching equipment TSE and those portions of the processing system, including a memory and a processor.

The data processing system shown may be of the type disclosed in U.S. Pat. No. 3,557,315 issued Jan. 19, 1971, and which includes telecommunication switching equipment TSE and a memory MEM and a processor PR for a computer.

The memory MEM includes:

a free time counter FTC to accumulate the free computer time FT counted in units of 25 microseconds during a time period of 100 milliseconds;

registers $RFT_1$ and $RFT_2$ storing first and second fixed time values $FT_1$ and $FT_2$, $FT_1$ being larger than $FT_2$. These time values are stored in units of 25 microseconds;

a call hopper CH to store data DNC about new calls;

a count register RNCP to store the number NCP of new calls processed by the computer during a time period of 100 milliseconds;

registers $RNC_0$ to $RNC_3$ storing fixed maximum numbers $NC_0$ to $NC_3$ of new calls allowed to be processed by the computer per time period of 100 milliseconds. Hereby $NC_0 > NC_1 > NC_2 > NC_3$.

The processor PR includes:
a bistable circuit BS;
a gating circuit GC;
AND-gating arrangements $GA_0$ to $GA_4$ and AND-gate G;
an inverter I;
a delay circuit DC providing a delay of 5 microseconds;
a call processing arrangement CPA to collect data DNC about new calls from the switching equipment TSE via a connection $c1$, to store these data DNC in the call hopper CH via connection $c2$ and the gating circuit GC, to extract these data DNC from the call hopper CH via the gating circuit GC, the gating arrangement $GA_4$ and a connection $c3$, to store the number NCP of new calls processed in the count register RNCP via a connection $c4$ and the gating circuit GC, and to register the end of a series of tasks performed during a time interval of 10 milliseconds in the bistable circuit BS via a connection $c5$;
a comparator $CR_1$ to compare the free computer time FT accumulated in the FTC with the first fixed time value $FT_1$ stored in the $RFT_1$. This comparator has an output Y1 which is activated when FT is at least equal to $FT_1$;
a comparator $CR_2$ to compare the free computer time FT with the second fixed time value $FT_2$ stored in the register $RFT_2$. This comparator has an output Y2 which is activated when FT is at most equal to $FT_2$;
a comparator $CR_3$ to compare one of the numbers of calls $NC_0$ to $NC_3$ stored in the $RNC_0$ to $RNC_3$ with the number NCP of new calls processed stored in the RNCP. This comparator has an output Y3 which is activated when NCP is at most equal to NCO (or $NC_1$, or $NC_2$, or $NC_3$) and which is connected to an input of the gating arrangement $GA_4$ via a connection $c6$;
a work load register WLR which is constituted by a five-position counter. This register WLR has an upcounting input Up, a downcounting input Dn and outputs 0 to 4. The downcounting input Dn is connected to the output Y1 of the comparator CR1 via the AND-gate G which is also controlled by the output 0 of the WLR via the inverter I, whilst the upcounting input Up is directly connected to the output Y2 of the comparator $CR_2$. The outputs 0 to 3 of the WLR are connected to one input of the comparator $CR_3$ via the AND-gating arrangements $GA_0$ to $GA_3$ which are controlled via the gating circuit GC by the registers $RNC_0$ to $RNC_3$ respectively. The output 4 of the WLR is an alarm output.
a clock $CL_1$ generating 2 microseconds output pulses at 10 milliseconds intervals and controlling the call processing arrangement CPA via a connection $c7$. Via a connection $c8$ the clock $CL_1$ also controls a clock $CL_2$ and is able to reset the bistable circuit BS;
a clock $CL_2$ generating 2 microseconds output pulses at 100 milliseconds intervals. This clock is controlled by the clock $CL_1$ via the connection $c8$ as already mentioned, and is able to reset the RNCP and to enable the comparators $CR_1$ and $CR_2$ via a connection $c9$. It is also able to reset the FTC via a connection $c10$ and the delay circuit DC;
a clock $CL_3$ providing 2 microseconds output pulses at 25 microseconds intervals. This clock $CL_3$ is controlled by the 1-output of the bistable circuit BS and is able to step the free time counter FTC via a connection $c11$ when this 1-output is activated.

The above-mentioned gating circuit GC is controlled by the call processing arrangement CPA via a control connection cc and is able to temporarily interconnect circuits in the memory MEM and circuits in the processor PR. More particularly, the call processing arrangement CPA controls the gating circuit GC in such a manner that a connection is temporarily established between:
the output $c2$ of the CPA and the CH when this CPA collects data from the TSE;
the CH and the input $c3$ of the CPA when this CPA tries to extract data from the CH;
the output $c4$ of the CPA and the RNCP each time this CPA has processed data relating to a new call;
the $RFT_1$ and the $CR_1$, the $RFT_2$ and the $CR_2$ and the FTC and the $CR_1$, $CR_2$ at the start of each time period of 100 milliseconds;
the RNCP and the $CR_3$, and the NCO to $NC_3$ and the $CR_3$ each time the CPA is trying to extract data from the CH.

The above-described system, including memory MEM and processor PR is adapted to control the establishment, supervision and release of communications through the switching equipment TSE by successively performing higher and lower priority tasks, or clock and base level programs respectively, in the way for instance described in the U.S. Pat. No. 3,557,315 to S. KOBUS et al. The computer starts the execution of these higher priority tasks every 10 milliseconds and when these tasks are finished and time is available it starts the execution of the lower priority tasks. When the computer works under normal load conditions these lower priority tasks are finished before the start of the next following 10 milliseconds time interval. Consequently, per time interval of 10 milliseconds and when working under normal work load conditions the computer normally has some free time available. Obviously, when the work load of the computer increases the available free time decreases and vice-versa. Hence, this free time is a measure of the work load of the computer and therefore of its occupancy level.

Figure 2:
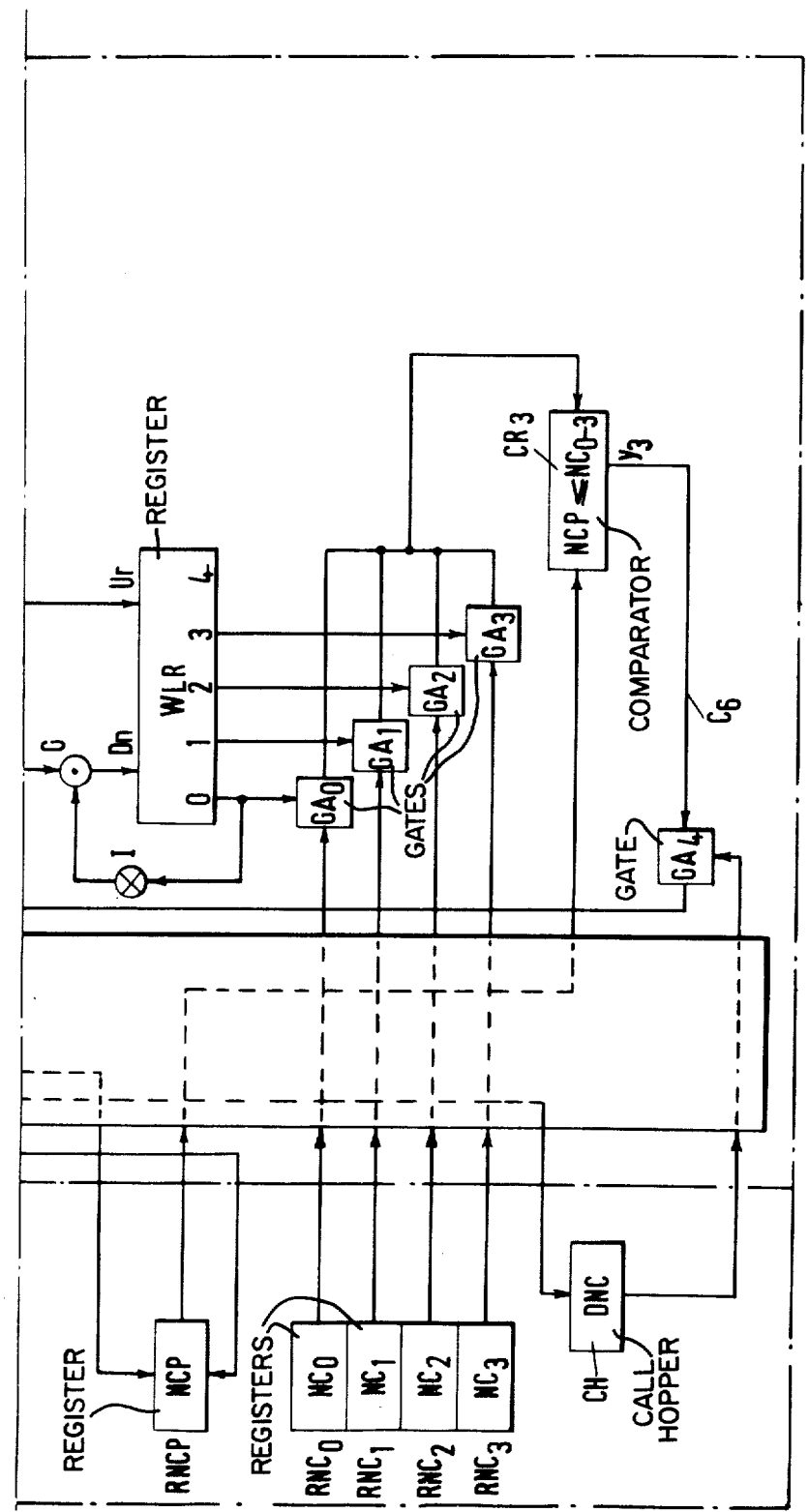
FIG. 2, which should be arranged below

In order to be prevented from being overloaded the computer includes occupancy level ascertaining means shown in FIG. 1 to ascertain the occupancy level of the computer by measuring the free time it has available per chosen unit time period of 100 milliseconds, and work load regulating means shown in FIG. 2 to regulate part of the computer work load in function of the ascertained occupancy level. This is described hereinafter.

As mentioned above, every 10 milliseconds the computer starts a series of higher priority tasks and when these are finished and time is available it executes a series of lower priority tasks. One of the higher priority tasks consists in collecting data DNC about new calls. These data DNC are collected by the call processing arrangement CPA from the switching equipment TSE via the connection $c1$ and stored in the call hopper CH via the connection $c2$ and the gating circuit GC. One of the lower priority tasks consists in collecting the data DNC about new calls from the call hopper CH via the gating circuit GC, the AND-gating arrangement $GA_4$ and the connection $c3$ and in processing these data in succession. Each time the data relating to a new call have been processed the call processing arrangement CPA increments the count register RNCP by one via the connection $c4$ and the gating circuit GC.

As will become clear later, the last-mentioned data processing task is the above-mentioned part of the work load which will be regulated to prevent the computer from being overloaded. This regulation is done by limiting more or less the number of data DNC regarding new calls allowed to be processed by the computer during a 100 milliseconds time period.

When all the lower priority tasks to be performed during a 10 milliseconds time interval have been finished before the end of this time interval, the call processing arrangement CPA sets the bistable circuit BS to its 1-condition via the connection $c5$. This bistable circuit BS starts the clock $CL_3$ which generates output pulses with a periodicity of 25 micro-seconds. These outputs pulses via the connection $c10$ step the free time counter FTC which thus accumulates this free time in units of 25 microseconds. At the start of the 10 milliseconds time interval following the one under consideration the bistable circuit BS is reset to its 0-condition via the connection $c8$, but the FTC is maintained in its position. This counter FTC thus accumulates for every 10 milliseconds time interval the free time FT elapsed since the execution of the last lower priority task of the computer.

At the start of every 10 milliseconds time interval defined by the clock $CL_1$ also the 100 milliseconds clock $CL_2$ is triggered and each time a 100 milliseconds time period has elapsed the clock $CL_2$ activates its outputs $c9$ and $c10$. Due to the output $c9$ being activated the operation of the comparators $CR_1$ and $CR_2$ is enabled and the register RNCP is reset, whilst the activated output $c10$ resets the free time counter FTC after the 5 microseconds time delay provided by the delay circuit DC has elapsed.

During the time period the FTC is not yet reset it stores the accummulated free time FT counter during the elapsed 100 milliseconds time interval. The enabled comparator $CR_1$ compares this accumulated free time FT with the time value $FT_1$ stored in the $RFT_1$ in units of 25 microseconds, whilst the comparator $CR_2$ compares the accumulated free time FT with the time value $FT_2$ stored in the $RFT_2$ in units of 25 microseconds. Hereby the time values FT, $FT_1$ and $FT_2$ are applied to the comparators $CR_1$ and $CR_2$ via the gating circuit CG.

It is clear that three cases are possible:

FT at least equal to $FT_1$, the output Y1 of the $CR_1$ being then activated;

FT at most equal to $FT_2$, the output Y2 of the $CR_2$ being then activated;

FT comprised between $FT_1$ and $FT_2$, none of the outputs $Y_1$ and $Y_2$ being then activated.

These cases will be examined hereinafter, but first the work load register WLR which may be in any of five positions 0 to 4 will be considered:

in each of the positions 0 to 3 the WLR indicates the corresponding maximum number of new calls allowed to be processed by the computer during a time period of 100 milliseconds. For instance, when the WLR is in the position 2 the maximum number of new calls allowed to be processed by the computer during a time period of 100 milliseconds is limited to the limit value $NC_2$. Indeed, when the CPA tries to extract data from the CH this limit value $NC_2$ is applied to one input of the comparator $CR_3$ via the gating circuit GC and the then enabled AND-gating arrangement $GA_2$, whilst the number NCP of calls processed by the computer is applied to the other input of the $CR_3$ via the AND-gating arrangement GC. Consequently, when the NCP becomes larger than $NC_2$ the output $Y_3$ of the $CR_3$ becomes de-activated and the gating arrangement $GA_4$ is inhibited thus preventing data from being extracted from the CH. Obviously when the WLR is in the position 0, 1 or 3 the computer is only allowed to process a maximum number of calls equal to $NC_0$, $NC_1$ and $NC_3$ respectively;

the position 4 of the WRL is an alarm position. When the WLR is brought in this position 4 alarm is given and special measures without importance for the present invention are then taken, e.g., the WLR is brought in the position 0 after the reasons for the alarm condition have been removed. This position 4 is not further considered hereinafter.

The above mentioned three cases FT at least equal to $FT_1$, FT at most equal to $FT_2$ and FT comprised between $FT_1$ and $FT_2$ are now considered in succession.

When at the end of a 100 milliseconds period the accumulated free time FT stored in the FTC is found to be at least equal to the time value $FT_1$, this means that during this period the occupancy level of the computer was fully normal. Therefore, if the maximum number of new calls allowed to be processed by the computer and indicated by the WR previously was equal to NCO (WLR in the position 0) nothing is done, whereas if this number was previously limited to $NC_1$-$NC_3$ (WLR in one of the positions 1-3) it is increased. Indeed, if the WLR is in the position 0 its output 0 is activated thereby inhibiting the AND-gate G via the inverter I and preventing the WLR from downcounting. On the contrary, if the WLR is in any of the positions 1 to 3 its output 0 is de-activated thereby activating one input of the AND-gate G via the inverter I. Since FT is supposed to be at least equal to $FT_1$ the output $Y_1$ of the comparator $CR_1$ is activated thereby activating the other input of the AND-gate G. Consequently also the down-counting input $Dn$ of the WLR is activated so that this WLR is brought from the position 1-3 in the position 0-2 respectively and that the number of new calls able to be processed by the computer is limited to $NC_0$-$NC_2$ respectively.

When at the end of a 100 milliseconds period the accumulated free time stored in the FTC is found to be at most equal to the time value $FT_2$, this means that during this period the occupancy level of the computer was abnormal. In this case the maximum number of new calls allowed to be processed by the computer and indicated by the WLR is decreased when the WLR is in any of the positions 0 to 3. Indeed, due to FT being at most equal to $FT_2$ the output $Y_2$ of the comparator $CR_2$ is activated when this comparator is operated thereby also activating the upcounting input Up of the WLR. Consequently, the WLR is then brought from any of the positions 0-3 in the positions 1-4 respectively.

Finally, when the accumulated free time FT stored in the FTC is comprised between the time values $FT_2$ and $FT_1$, this means that inside the 100 milliseconds time period during which the FT was measured the work load of the computer was neither fully normal nor abnormal. Therefore, the maximum number of new calls allowed to be processed by the computer and indicated by the WLR is not modified. Indeed, due to FT being comprised between $FT_2$ and $FT_1$ none of the outputs $Y_1$ and $Y_2$ of the $CR_1$ and the $CR_2$ is activated, so that the WLR is maintained in its position.

From the above described examples follows that the ascertaining means shown in FIG. 1 periodically measure the free computer time FT after time periods at least equal to 10 milliseconds (in the examples these time periods are equal to 100 milliseconds) and determine the computer occupancy level from the measured free time. This occupancy level is either fully normal, abnormal or neither fully normal nor abnormal when the measured free time is at least equal to a first time value $FT_1$, is at most equal to a second time value $FT_2$, and is comprised between these first and second time values respectively. The work load regulating means shown in FIG. 2 are controlled by the above ascertaining means and regulate part of the computer work load by limiting the number of new calls allowed to be processed by the computer. Each time the ascertaining means detect a normal computer occupancy level this limit value is increased, whereas it is decreased each time the ascertaining means detect an abnormal computer occupancy level. In case the detected computer occupancy level is found to be neither fully normal nor abnormal the above limit value is maintained unchanged.

In the above described examples two different time values $FT_1$ and $FT_2$ are used to decide whether or not the number of new calls allowed to be processed by the computer should be modified. This is done in order to substantially prevent this number from being alternately decreased and increased when the measured free computer time alternately decreases and increases. Indeed, when the free computer time measured is found to have decreased below the time value $FT_1$, the above number is only decreased when the measured free time has decreased below or has become equal to the time value $FT_2$. On the other hand, when the free computer time measured is found to have increased above the time value $FT_2$, the above number is only increased when the measured free time has increased above or has become equal to the time value $FT_1$.

Instead of varying the work load by limiting more or less the number of new calls able to be processed by the computer one may also vary this work load by limiting more or less the number of new calls collected from the switching equipment TSE.

Also, instead of maintaining the computer work load constant when the measured free time FT is found to be comprised between the time values $FT_2$ and $FT_1$, one may in this case maintain the work load constant if the previously measured free time FT, i.e., the one measured at the end of the preceding time period of 100 ms, was found to be smaller than $FT_1$ and increase this work load if the previously measured free time FT was found to be larger than $FT_1$.

This load increase is continued after each step until the maximum limit work load value $NC_0$ is reached or the measured free time FT is smaller than the time value $FT_2$.

While the principles of the invention have been described above in connection with specific apparatus, it is to be clearly understood that this description is made only by way of an example and not as a limitation on the scope of the invention.

We claim:

1. In a data processing system, apparatus for measuring and regulating computer work load, the work load comprising calls randomly originated and processed through said system, in which the processing of priority tasks within said system is initiated within the computer at predetermined time intervals, the invention comprising: means for monitoring the condition of said computer at successive timed subintervals, means for counting and storing a continuing count of the total of one of said monitored conditions over a predetermined timed period comprising a multiple of said time intervals, a first and a second settable register for storing first and second numbers representing upper and lower limits for said count, means operative at the end of said timed period for comparing said stored count against said upper and lower limits, and a work load regulator responsive to the results of the comparison between the monitored count and the limits for regulating the number of calls processed by said computer.

2. In a system as claimed in claim 1, wherein said apparatus further includes a second register coupled to receive data on the number of calls originated in said system during said timed period.

3. In a processing system as claimed in claim 2, wherein the apparatus further includes means for setting the register at one of a plurality of work load levels to thereby set said register for a desired work load for said computer.

4. An apparatus for regulating the work load of a computer within a data processing system, said apparatus including a register having a plurality of finite work load levels, means for varying the load levels at said register, said varying means comprising means for monitoring the condition of said computer as busy or idle at predetermined subintervals within a time period and for maintaining a count of the monitored condition occurring during said time period, a plurality of registers settable to settings representing upper and lower limits for said counts, means operative after the end of each timed period for comparing the monitored count against said count limits, and means responsive to said monitored count reaching either of said count limits for setting the work load register to a different work load level dependent on the specific count limit reached.

5. Apparatus for regulating the work load of a computer in a data processing system, the work load being comprised of randomly initiated new calls entering said system as processed by said computer during short duration processing cycles, said apparatus including means for monitoring new calls initiated into said system and for storing the number of said new calls initiated during a timed period, a register settable to one of a plurality of positions each representing a number of new calls into said system whereby to control the number of new initiated calls to be processed by said computer, means for monitoring the computer at recurring finite intervals of time and for maintaining a count of the busy status of said computer encountered at said intervals during said timed period, means operative at the end of said timed period for comparing said count against an upper and a lower set count, and output paths from said comparing means for resetting said register to another position in response to said count corresponding to one of said set counts.

6. An apparatus as claimed in claim 5, in which said new call register comprises a plurality of counters settable to a plurality of new call levels and in which there are gating means coupling the output of each of said counters to a separate one of said call level positions, and in which there is a comparator for comparing the output of said new call counter with the output of said gating means.

7. An apparatus as claimed in claim 5, in which said settable register comprises a counter with a down count input and an up count input, said inputs each comprising outputs of said count comparing means.

* * * * *